United States Patent [19]

Shaffer

[11] 3,976,158
[45] Aug. 24, 1976

[54] POWER STEERING SYSTEM FOR ELECTRIC-DRIVE LIFT TRUCK

[75] Inventor: Walter M. Shaffer, Peoria, Ill.

[73] Assignee: Caterpillar Tractor Co., Peoria, Ill.

[22] Filed: Apr. 25, 1975

[21] Appl. No.: 571,830

[52] U.S. Cl. .............................. 180/132; 60/404; 60/418
[51] Int. Cl.² ................................................ B62D 5/06
[58] Field of Search ............... 180/79.2 R; 60/418, 60/413, 404

[56] References Cited
UNITED STATES PATENTS

| | | | |
|---|---|---|---|
| 2,330,739 | 9/1943 | Piron | 60/418 X |
| 3,083,533 | 4/1963 | Schenkelberger | 180/79.2 R |

Primary Examiner—M. H. Wood, Jr.
Assistant Examiner—John A. Pekar
Attorney, Agent, or Firm—Phillips, Moore, Weissenberger Lempio & Strabala

[57] ABSTRACT

A hydraulic system for an electrically powered lift truck or the like supplies pressurized fluid for powering implements and for powering a hydraulic power steering system which is provided with hydraulic accumulator means for accumulating a supply of pressurized fluid for providing fluid for steering the vehicle for a predetermined period of time. A pressure-responsive charging valve is provided for maintaining a minimum amount of pressure in the accumulator and includes control means responsive to system pressure for activation and deactivation of an electric motor for powering a pump for the system.

7 Claims, 4 Drawing Figures

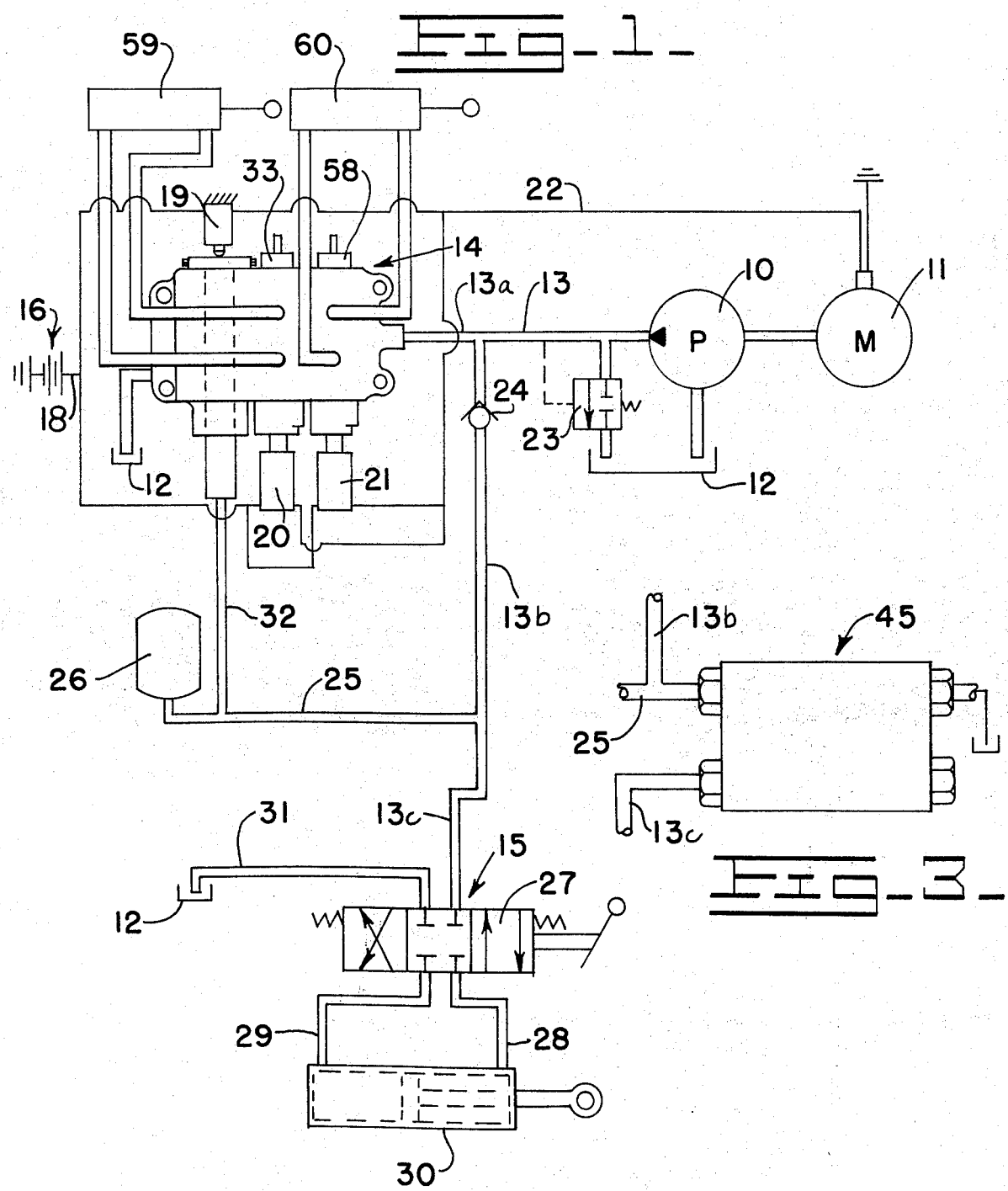

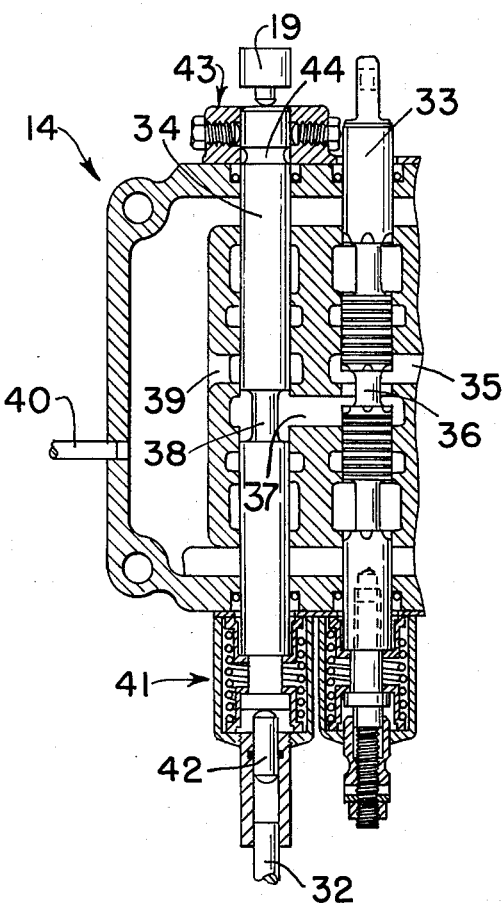
Fig_2_
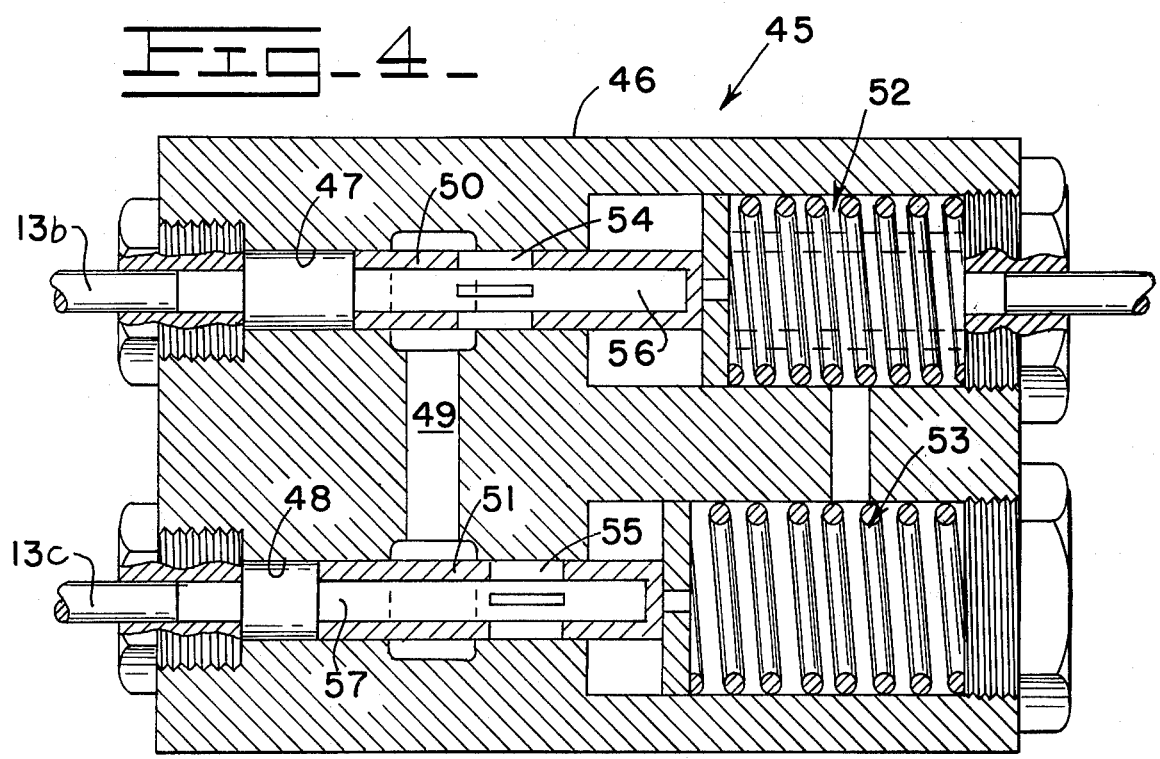
Fig_4_

POWER STEERING SYSTEM FOR ELECTRIC-DRIVE LIFT TRUCK

BACKGROUND OF THE INVENTION

The present invention relates to power steering systems and pertains particularly to power steering for an electrically powered vehicle.

Vehicles such as lift trucks and the like used inside warehouses and the like are normally electrically powered because of ventilation problems associated with internal combustion engines. Such vehicles can be quite large and handle quite heavy loads. For this reason it is quite often necessary to have power steering on such vehicles.

Power steering systems for such vehicles are frequently hydraulically powered with fluid supplied by a pump driven by an electrical motor. The source of the steering fluid may also be the same source as that supplied for the tilt and lift cylinders of the lift assembly. Because of the infrequent use of these cylinders and because of the low volume of fluid required for the steering system, the system is normally constructed to cut off the electric motor when fluid is not required by one of the systems. This is done in an effort to save energy required for a constantly running motor.

On the other hand, the steering of such vehicles requires frequent correction of the steering and thus very frequent small supplies of fluid from the system. For this reason, as soon as the steering system is activated, the electric motor is immediately started. This constant starting and stopping of the electric motor also constitutes a considerable waste of electrical power and also results in severe wear and tear on the electric motor and system.

SUMMARY AND OBJECTS OF THE INVENTION

It is the primary object of the present invention to overcome the above problems of the prior art.

Another object of the present invention is to provide a hydraulically powered steering system for electrically driven vehicles having hydraulically powered implements.

A further object of the present invention is to provide an electrically powered vehicle having hydraulically powered implements with a hydraulic power steering system with accumulator means for the power steering system and automatic control means therefor.

In accordance with the primary aspect of the present invention, an electrically powered vehicle having hydraulically powered implements and a hydraulically operated power steering system is provided with accumulator for accumulating a quantity of pressurized fluid, with means for communicating the accumulated fluid to the power steering system, and including control means responsive to the accumulated fluid pressure for controlling the operation of an electric motor powering the fluid system.

BRIEF DESCRIPTION OF THE DRAWINGS

The above and other objects and advantages of the present invention will become apparent from the following description when read in conjunction with the drawings, wherein:

FIG. 1 is a schematic layout of a hydraulic steering system incorporating the present invention;

FIG. 2 is a portion of the accumulator valve of the system of FIG. 1;

FIG. 3 is a plan view of a pressure-reducing and flow-control valve for modifying the system of FIG. 1; and, FIG. 4 is a sectional view of the valve of FIG. 3.

DETAILED DESCRIPTION OF THE PREFERRED EMBODIMENTS

Turning now to FIG. 1 of the drawings, there is illustrated a system in accordance with the present invention comprising a suitable source of pressurized hydraulic fluid comprising a pump 10 driven by an electric motor 11 drawing fluid from a sump or tank 12 and supplying it by way of a main supply line 13 to portions of the hydraulic system including a first bank of valves 14 for performing functions to be described later, and a steering valve indicated generally at 15.

The motor 11 would normally be a separate motor on a vehicle such as a lift truck or the like and will not be the propulsion motor of the vehicle. A suitable electrical system including a suitable source of electrical power, such as a battery 16, is suitably connected such as by electrical conductor 18 to a series of switches 19, 20 and 21 which in turn are connected by a conductor 22 to the motor 11. The current to the motor 11 is controlled by any one of switches 19–21, which may be connected in any suitable manner such that the motor will be started or supplied with power when any one of the valve stems in the bank 14 is moved to a fluid-consuming position.

The hydraulic system is provided with suitable relief valve means 23 to protect the system from over-pressurization by relieving the pressure thereof to the sump or tank 12. The main fluid supply conduit 13 includes a branch 13A supplying fluid to the valve 14 and a branch 13B supplying fluid to the steering valve 15. A check valve 24 prevents return of fluid from line 13B back toward the pump 10 or to the bank of valves 14.

A line or conduit 25 branches from conduit 13B for supplying fluid to an accumulator 26 which is operative to accumulate a quantity of fluid under pressure.

The steering valve 15 includes a valve spool 27 of the closed-center type such that when the valve is in the neutral position, fluid is backed up behind the valve and pressure maintained in the supply line. The valve spool 27 is shiftable from the neutral blocking position to either one of positions to either side thereof for directing fluid by way of suitable conduits 28 and 29 to a hydraulic motor or cylinder 30 of the double-acting type for either steering or assisting in steering or the like of a vehicle. The valve 27 communicates the supply line with one of the motor control lines 28 or 29 and the opposite motor line with tank or sump 12 by suitable return line 31. A suitable conduit 32 communicates pressurized fluid from the accumulator 26 for control of a steering system charging valve to be described.

Turning now to FIG. 2, a cross-sectional view of a portion of the valve bank 14 illustrates that the bank includes at least one open-centered valve spool 33 mounted upstream of a closed-centered charging valve spool 34. The open-centered valve 33 may be either the lift or tilt cylinder valve of a lift truck and is operative to control the passage of fluid from an inlet through passage comprising an inlet 35 whereby the fluid passes over the spool 33 by way of a groove 36 and by way of a passage 37 to the spool 34. The spool 34 includes a slot 38 which is operative to provide communication between the passage 37 and an exhaust passage 39 which is in communication by way of the return passage 40 to sump or tank 12. The valve spool 33 is open centered and is normally biased to its neutral position as indicated for free flow of fluid thereby. Upon shifting of the valve from the neutral position as illustrated, the fluid may be directed to either one of a pair of motor-control passages for operating a motor 59. Preferably the spool is also operative to actuate the switch 20 for controlling the motor 11 such that should the spool be shifted from the central position to a motor-actuating position, fluid is supplied thereto by the system.

It should, of course, be appreciated that the present control system includes in combination an implement system having open-center control valves. For example, the valve body indicated generally at 14 comprises the valve stem 33 previously described and a valve stem 58. These valve stems are operative to selectively direct or communicate fluid to one or more hydraulic motors 59 and 60 for operating implements such as the lift of the forks and the tilt of the mast of a lift-truck type vehicle. Both valves 33 and 58 are of the open-centered type such that when in the neutral position, fluid from the pump flows thereby to the sump 12. Thus, in this condition, no fluid pressure is available in the line 31 to charge the accumulator 26 without the existence of the charging valve of the present invention. However, it will be noted that when either one of the valves 33 or 58 is displaced from the neutral position, pressure will build up in supply line 13 sufficient to actuate the respective motor 59 or 60 and that pressure is communicated to the accumulator 26. Fluid is also available to the steering valve 15 for use in the steering of the system. Thus, in summary, the present arrangement of the steering system is for use in combination with an open-centered implement system.

The charging valve or spool 34 is normally biased to its closed position as illustrated by means of a suitable centering spring arrangement indicated generally at 41 so that the spool in its normal position blocks flow of fluid by way of passage 37 to passage 39, thus maintaining pressure within the hydraulic system.

Turning now back to FIG. 1, it will be seen that with valve spool 27 and valve spool 34 both in neutral or blocking positions, fluid supplied by way of conduit 13 will flow along conduit branch 13B by way of conduit 25 to the accumulator 26. As the fluid accumulates in the accumulator 26 and the pressure rises, that pressure is transmitted along conduit 32 to act on a piston 42 acting on the end of the spool 34 to bias it to a position upward away from its illustrated position to a position of communication between passages 37 and 39 by way of annular groove or passage 38. Upon movement of the spool to this position, the end of spool 34 acts on switch 19 to cut off the current to motor 11 and thus stop the motor unless that motor is being required by one of the upstream valves.

Suitable detent means including one or more spring-biased ball assemblies 43 mounted in the housing engages a slot 44 formed on spool 34 for retaining the spool in open position until the pressure acting on piston 42 drops below a predetermined level. At this point the spring 41 acting on the spool will overcome the detent means 43 and 44 and move the spool back to its fluid blocking position, at which point simultaneously switch 19 will activate the circuit to start motor 11, which in turn will start fluid flowing in the conduit means 13 and branch lines 13B to supply fluid by way of conduit 25 to the accumulator 26 until pressure builds up within the system again to a level sufficient to shift the spool 34 back to its open position and simultaneously operate switch 19 cut off the motor 11. The accumulator 26 is preferably of sufficient volume to provide a significant number of cycles of the hydraulic cylinder 30 for correcting steering in the vehicle. With this arrangement the fluid from the accumulator will be sufficient to activate the steering system for a considerable number of cycles and thus prevent constant starting and stopping of motor 11 and the resultant wear and tear thereon.

Because of the relatively high pressures and flow rates required for the lift cylinders of a lift truck, the fluid pressure and flow rate to the steering valve 15 may be excessive for optimum operation. The system may then be modified by flow-control and pressure-reducing valves within the system as seen in FIG. 1. This valve 45 will simply be placed within the system in line 13C between the juncture of the branch conduit 13B and conduit 25. The valve 45 may be of any suitable type but as best illustrated in FIG. 4 comprises a housing 46 having first and second cylindrical bores 47 and 48 connected by a passage 49. A pair of metering spools 50 and 51 are respectively mounted within the bores 47 and 48 and are biased toward their open position by spring assemblies 52 and 53. The spools 50 and 51 include respective metering slots 54 and 55 for communicating fluid between central bores thereof 56 and 57 the inlet and outlet conduits and passage 49.

The spool 50 is operative in response to upstream pressure in line 13C to meter flow in accordance with that pressure. Thus, the higher the flow, the lower the pressure. The valve spool 51 is responsive to downstream pressure to control the flow and consequently the pressure between passage 49 and the downstream side of line 13C. Thus, the higher the downstream pressure the more restricted the flow through metering slots or passages 55.

From the above description it is seen that there is provided a hydraulic power steering system for an electrically driven vehicle wherein the hydraulic power steering system includes accumulator means for storing a supply of hydraulic fluid for operation of the steering system and includes automatic control means for cutting out an electrically driven pump when adequate fluid has been accumulated.

What is claimed is:

1. A hydraulic steering system for an electrically powered vehicle comprising in combination:
   a reservoir;
   a hydraulic pump for drawing fluid from said reservoir;
   means for driving said pump including an electric motor and a source of electric power including a circuit for said electric motor;
   steering motor means;
   implement motor means;
   steering circuit means including accumulator means for selectively directing hydraulic fluid for powering said steering motor means;
   implement circuit means including open centered control valve means operative in a neutral position for directing fluid from said pump to said reservoir and movable to other positions for selectively directing hydraulic fluid for powering said implement motor means;
   pressure responsive control means for activating and deactivating said electric motor for establishing and maintaining a predetermined minimum fluid pressure in said accumulator means for said steering circuit; and, a charging valve normally biased to a closed position for diverting fluid from said source to said accumulator, and said charging valve responsive to a predetermined pressure in said accumulator to move to an open position for communicating said fluid to exhaust, wherein said pressure responsive control means includes an electrical switch for controlling communication of electric power to said motor, and said switch being disposed adjacent said charging valve for actuation thereby when said charging valve is shifted.

2. A hydraulic steering system for an electrically powered vehicle comprising in combination:

a reservoir;

a hydraulic pump for drawing fluid from said reservoir;

means for driving said pump including an electric motor and a source of electric power including a circuit for said electric motor;

steering motor means;

implement motor means;

steering circuit means including accumulator means for selectively directing hydraulic fluid for powering said steering motor means;

implement circuit means including open centered control valve means operative in a neutral position for directing fluid from said pump to said reservoir and movable to other positions for selectively directing hydraulic fluid for powering said implement motor means;

pressure responsive control means for activating and deactivating said electric motor for establishing and maintaining a predetermined minimum fluid pressure in said accumulator means for said steering circuit;

a charging valve normally biased to a closed position for diverting fluid from said source to said accumulator, and said charging valve responsive to a predetermined pressure in said accumulator to move to an open position for communicating said fluid to exhaust; and, detent means for resisting movement of said charging valve from said open position.

3. A hydraulic steering system for an electrically powered vehicle comprising in combination:

a reservoir;

a hydraulic pump for drawing fluid from said reservoir;

means for driving said pump including an electric motor and a source of electric power including a circuit for said electric motor;

steering motor means;

implement motor means;

steering circuit means including accumulator means for selectively directing hydraulic fluid for powering said steering motor means;

implement circuit means including open centered control valve means operative in a neutral position for directing fluid from said pump to said reservoir and movable to other positions for selectively directing hydraulic fluid for powering said implement motor means; and pressure responsive control means for activating and deactivating said electric motor for establishing and maintaining a predetermined minimum fluid pressure in said accumulator means for said steering circuit;

a charging valve normally biased to a closed position for diverting fluid from said source to said accumulator, and said charging valve responsive to a predetermined pressure in said accumulator to move to an open position for communicating said fluid to exhaust, wherein said pressure responsive control means includes an electrical switch for controlling communication of electric power to said motor, and said switch being disposed adjacent said charging valve for actuation thereby when said charging valve is shifted; and, detent means for resisting movement of said charging valve from said open position.

4. The steering system of claim 3 comprising pressure-reducing valve means for controlling the pressure of fluid communicated to said steering valve means.

5. The steering system of claim 4 wherein said source of pressurized fluid comprises a hydraulic system for supplying fluid for lift and tilt cylinders of a lift truck and includes at least one control valve, and said control valve is positioned within said hydraulic system to have priority over said charging valve.

6. A hydraulic steering system for an electrically powered vehicle comprising in combination:

a reservoir;

a hydraulic pump for drawing fluid from said reservoir;

means for driving said pump including an electric motor and a source of electric power including a circuit for said electric motor;

steering motor means;

implement motor means;

steering circuit means including accumulator means for selectively directing hydraulic fluid for powering said steering motor means;

implement circuit means including open centered control valve means operative in a neutral position for directing fluid from said pump to said reservoir and movable to other positions for selectively directing hydraulic fluid for powering said implement motor means;

pressure responsive control means for activating and deactivating said electric motor for establishing and maintaining a predetermined minimum fluid pressure in said accumulator means for said steering circuit; and, pressure-reducing valve means disposed between said accumulator means and said steering valve for controlling the pressure of fluid communicated to said steering valve.

7. A hydraulic steering system for an electrically powered vehicle comprising in combination:

a reservoir;

a hydraulic pump for drawing fluid from said reservoir;

means for driving said pump including an electric motor and a source of electric power including a circuit for said electric motor;

steering motor means;

implement motor means;

steering circuit means including accumulator means for selectively directing hydraulic fluid for powering said steering motor means;

implement circuit means including open centered control valve means operative in a neutral position for directing fluid from said pump to said reservoir and movable to other positions for selectively directing hydraulic fluid for powering said implement motor means; and pressure responsive control means for activating and deactivating said electric motor for establishing and maintaining a predetermined minimum fluid pressure in said accumulator means for said steering circuit, wherein said accumulator means includes an accumulator charging valve responsive to a predetermined pressure in said accumulator for directing fluid from said source to exhaust, wherein said source of pressurized fluid comprises a hydraulic system for supplying fluid for lift and tilt cylinders of a lift truck and includes at least one control valve, and said control valve is positioned within said hydraulic system to have priority over said charging valve.

* * * * *

UNITED STATES PATENT AND TRADEMARK OFFICE
CERTIFICATE OF CORRECTION

PATENT NO. : 3,976,158

DATED : August 24, 1976

INVENTOR(S) : WALTER M. SHAFFER

It is certified that error appears in the above-identified patent and that said Letters Patent are hereby corrected as shown below:

```
Column 3, line 23, change "31" to ---13---
Column 4, line 30, change "13C" to ---13B---
Claim 1, Column 5, line 4, change "source" to ---pump---
Claim 2, Column 5, line 40, change "source" to ---pump---
Claim 3, Column 6, line 4, change "source" to ---pump---
Claim 4, Column 6, line 18, change "valve" to ---motor---
Claim 5, Column 6, lines 19 & 20, delete "source of"
Claim 5, Column 6, line 20, delete "comprises" and insert
   ---from the pump is communicated to the charging valve via---
Claim 5, Column 6, line 21, delete "a lift truck" and insert
   ---the vehicle---
Claim 6, Column 6, line 50, delete "valve" and insert ---motor---
Claim 6, Column 6, line 52, delete "valve" and insert ---motor---
Claim 7, Column 8, line 2, delete "source" and insert ---pump---
Claim 7, column 8, line 3, delete "source of"
Claim 7, Column 8, line 3, delete "comprises" and insert
   ---from the pump is communicated to the charging valve via---
Claim 7, Column 8, line 5, delete "a lift truck" and insert
   ---the vehicle---
Claim 7, Column 8, line 6, delete "and said control valve is"
```

Signed and Sealed this thirtieth Day of August 1977

[SEAL]

Attest:

RUTH C. MASON
*Attesting Officer*

C. MARSHALL DANN
*Commissioner of Patents and Trademarks*